Sept. 27, 1932.  R. C. SCHEMMEL  1,880,156
ELECTRIC WIRE CONDUIT
Filed Feb. 21, 1931
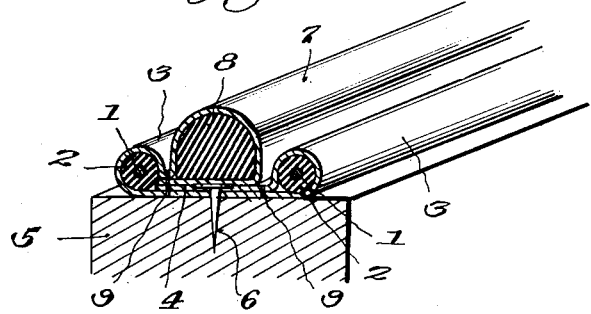
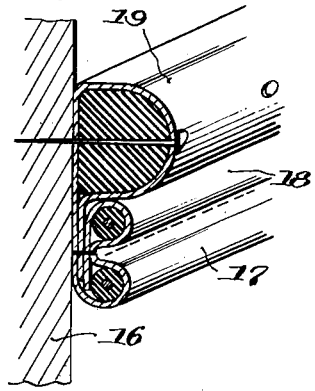
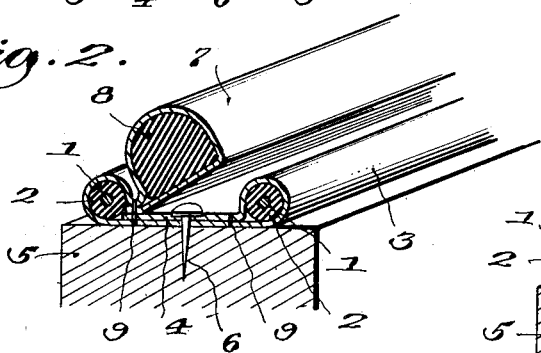
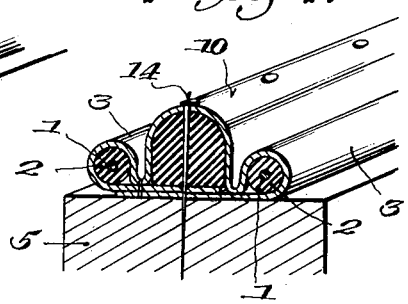
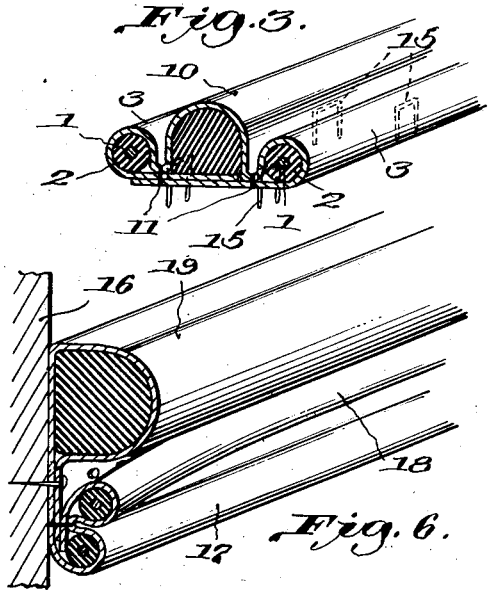
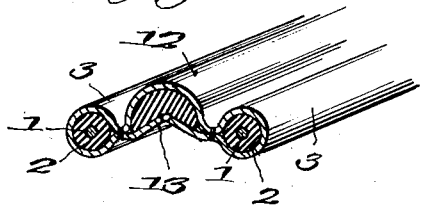
Inventor
Robert C. Schemmel
By Dyne + Kirchner
Attorneys Patented Sept. 27, 1932

1,880,156

UNITED STATES PATENT OFFICE

ROBERT C. SCHEMMEL, OF UNION CITY, INDIANA

ELECTRIC WIRE CONDUIT

Application filed February 21, 1931. Serial No. 517,597.

My invention relates to electric wire conduits and has for an object the provision of a conduit carrying one or more electric conducting wires encased in an insulating sheath and provided with means for protecting said sheath from accidental mutilation.

The invention relates generally to electric wire conduits comprising a fabric covering folded upon itself and containing an electric conducting wire or wires encased in a bead formed by a fold in the fabric covering. Conduits of this type are used for mounting wires on walls, floors, ceilings and the like. Such conduits are frequently affixed to the baseboard or wainscoting of an interior, and in such locations are subject to injury through contact with such instrumentalities as furniture, floor cleaning devices and the like. Prior to my present invention conduits of this general type have been subject to injury from such causes, resulting in abrasion and removal of a portion of the insulating covering of the wires, so that the wires have become exposed and liable to short circuiting. It is an object of the present invention to provide the conduit with an enlarged protective bead, which may be distinct from the beads carrying the conductor wires, and is mounted in the conduit in close proximity to the wire containing beads. In actual use the protective bead is intended to receive accidental impacts from foreign bodies, absorb the shocks thereof, and relieve the wire coverings from the possibility of injury and mutilation.

Other objects and advantages of the invention will sufficiently appear from the detail description of certain preferred embodiments of the invention in the following specification.

In the drawing which forms part of this application for Letters Patent, and in which the same reference character designates the same part in the several views, Figures 1, 2, 3, 4, 5, 6 and 7 are perspective views with one end in section of certain preferred types of conduit embodying the principles of the present invention.

Referring now to the drawing, Figs. 1 and 2 illustrate a preferred type of conduit constructed according to the principles of the present invention. The conduit of Figs. 1 and 2 is a blind nail device, i. e., one which contains an area adapted to receive tacks or the like used in securing the conduit in place upon a support, and containing another portion hinged in the structure and adapted in one position to be raised from the tack receiving area for insertion of the tacks, and in another position to be folded down upon the tack receiving area to conceal the tack heads.

The conduit is formed of a strip of fabric, which may be leather, imitation leather such as coated or doped textile material, or the like. The fabric is folded upon itself over a pair of electric conducting wires of copper or the like, 1, encased in an insulating sheath 2 of rubber or equivalent non-conducting material. The folded fabric, disposed over the wires 1 and their surrounding insulating coverings 2, forms tubular beads 3, which I prefer to dispose in parallel pairs, one bead at each longitudinal edge of the conduit.

The area of the conduit between the wire containing beads 3, 3, is disposed in the form of a web 4, which serves as the tack receiving area of the structure.

The area 4, between the wire containing beads 3, 3, together with these wire containing beads, constitutes the base portion of the conduit, and is adapted to be applied to any support 5 by means of tacks or the like 6 passed through the base portion intermediate the wire containing beads 3, 3.

Surmounting the intermediate portion of the base is a bumper or protective bead 7, formed by a filler 8 encased in a fold of the common covering fabric. It is of the essence of the invention that the bumper bead 7 be so formed that its top surface lies well above the top surface of each of the wire containing beads 3, 3. It will be evident that a bumper bead 7 so proportioned with respect to the wire containing beads 3, 3, will serve, when the conduit is installed, to receive accidental blows from solid objects which might, in the absence of the bumper bead, have been received by the wire containing beads, with consequent injury and mutilation thereof.

In a preferred form of the invention, illustrated in Figs. 1 and 2, I mount the bumper bead 7 over the central area of the base portion by means of a side hinge connection 9, enabling the bumper bead to be lifted from the central area of the base, as shown in Fig. 2, to permit tacks 6 to be passed through the web 4 to secure the structure in place upon a support.

In the embodiment of the invention shown in Fig. 3 the bumper bead is designated 10. The protective capacity of the bead 10 is identical with that of the bead 7, but the bead 10, unlike the bead 7, is secured to the base portion of the conduit at both sides thereof, conveniently by lines of stitching 11, 11, which pass through the bead covering and the base forming plies of the fabric. It will be evident that the structure of Fig. 3 is not capable of blind nailing, but may be secured in place upon its support by brads or staples passed through the structure and into the support substantially along the lines of stitching 11, 11.

The modification shown in Fig. 4 is similar to that of Fig. 3 in that it lacks the blind nailing capacity of the device in Figs. 1 and 2. While the conduit of Fig. 3 is slightly less expensive of manufacture than that of Figs. 1 and 2, the type shown in Fig. 4 may be made still more cheaply. The added economy which characterizes the conduit of Fig. 4 results from the use in protective bead 12 of a minimum of material. This saving of material is brought about by the provision of a pronounced groove or recess 13 formed in the underside of the bead, as shown in Fig. 4. I have found that such a bead may be conveniently produced of a relatively low grade rubber, which will be sufficiently self-sustaining to maintain the upper surface of the bumper bead 12 as securely and substantially in place as if the bottom surface of the bumper bead rested directly on the support, as in the case of the other forms of the invention shown in the drawing.

In the case of installations where appearance is not a factor of great importance, it may be convenient to secure in place the type of conduit shown in Fig. 3 by means of relatively long nails 14 passed through the large bumper bead 10 and into the support 5, as shown in Fig. 7, instead of employing the relatively inconspicuous and practically concealed staples 15 as shown in Fig. 3.

In Figs. 5 and 6 I have illustrated a further modification which is particularly adapted to be used where the wiring installation is to be disposed along the vertical surface 16 of a support, such for example as the baseboard or wainscoting of a room, where wire coverings are liable to be subject to injuries and mutilation on account of impacts from pieces of furniture, floor and carpet cleaning instrumentalities, or even accidental blows from the feet of persons. This form of conduit comprises a fabric folded upon itself to provide one or more, preferably two, wire containing beads 17, 18, along one longitudinal edge of the conduit. The other edge is provided with a bumper bead 19, which is considerably larger than either of the wire-containing beads and consequently extends a greater distance outwardly from the base of the conduit than do either of the wire-containing beads. This conduit is intended to be installed on the vertical surface of a wall with the larger or bumper bead uppermost, the wire-containing beads being disposed beneath the bumper bead so as to be protected thereby from injury from descending or laterally directed blows, as will be readily understood.

The conduit of Figs. 5 and 6 may be secured in place upon the support in any of several ways. Two preferred methods are illustrated in the drawing. According to Fig. 5, relatively long nails are passed through the bumper bead, and this type of mounting is recommended for installations where appearance is not of great consequence. Where, however, it is desirable to conceal the fastening means, the conduit may be applied by rolling outwardly the inner wire-containing bead 18, as shown in Fig. 6, passing tacks or the like through the base of the conduit beneath the bead 18, and then permitting the displaced bead to spring back in place to conceal the tack heads.

It will be understood that the invention is by no means limited to structures made of any particular materials. Thus, as has been pointed out, the enclosing fabric may be formed of a wide variety of sheet materials. Similarly the bead fillers may be of rubber, various compositions, twisted paper, or any other material which is capable of providing a relatively resistant foundation for the portion of the covering material which forms the bumper bead 7, 10 or 12.

It is to be understood furthermore that I have shown and described in the accompanying drawing the present invention in certain preferred forms of embodiment only, merely by way of exemplification. The invention is capable of embodiment in other and further forms, but all such modifications, to the extent that they embody the principles of the invention as pointed out in the appended claims, are to be deemed within the scope and purview thereof.

Having thus described my present invention what I claim and desire to secure by Letters Patent is:

1. An electric wire conduit including a fabric folded upon itself to form a base portion, a bead formed in said base portion containing an electric wire, and another bead formed on said base portion and devoid of electric wire having its top surface extended higher above the base portion than said wire containing bead.

2. An electric wire conduit including a covering fabric folded upon itself to form a base portion adapted to be secured to a support, a bead formed along each of the longitudinal edges of the base portion, an electric wire contained in each of said beads, and a protective bead devoid of electric wire formed on said base portion intermediate said wire-containing beads having its top surface extending higher above the base portion than said wire-containing beads.

3. An electric wire conduit as claimed in claim 2, in which the protective bead is hinged along one of its edges and adapted to be lifted from the base portion to permit fastening tacks to be passed through the base portion and into a support and to be closed down upon the base portion to conceal the heads of said tacks.

4. An electric wire conduit as claimed in claim 2, in which the protective bead is provided with lines of stitching along both of its edges securing said bead to the base portion, the base portion along said lines of stitching being relatively thin and adapted to receive fastening means for securing the conduit to a support.

5. An electric wire conduit as claimed in claim 2, in which the under surface of the protective bead is recessed with a longitudinal central groove.

6. An electric wire conduit comprising a fabric, a plurality of fillers enclosed in folds in the fabric, the lower surfaces of each of the fillers lying in substantially the same plane, an electric conducting wire contained within one of said fillers, another of said fillers being devoid of electric conducting wire and substantially larger in cross section than said wire-containing filler so that the upper surface of said larger filler lies substantially above the upper surface of said wire-containing filler.

7. An electric wire conduit including a fabric folded upon itself to form a base portion, a pair of beads formed in said base portion along one longitudinal edge thereof, an electric conducting wire contained in each of said beads, and a third bead formed on said base portion adjacent to said wire-containing beads having its top surface extended higher above the base portion than said wire containing beads.

8. In combination with a support, a wire conduit as claimed in claim 7 secured to a vertical surface of the support, said third bead being uppermost and said wire-containing beads being disposed beneath said third bead and protected thereby.

In testimony whereof I affix my signature.

ROBERT C. SCHEMMEL.